2 Sheets--Sheet 1.

J. F. KIRKHART & J. RAMSAY.
Water-Wheels.

No. 143,984.　　　　　　　　Patented Oct. 28, 1873.

Witnesses　　　　　　　　Inventors
Henry Orth　　　　　　　　Joseph F. Kirkhart
G. B. Fowles　　　　　　　James Ramsay
　　　　　　　　　　　　　By W. Burris
　　　　　　　　　　　　　　Atty.

AM. PHOTO-LITHOGRAPHIC CO. N.Y. (OSBORNE'S PROCESS)

2 Sheets--Sheet 2.

J. F. KIRKHART & J. RAMSAY.
Water-Wheels.

No. 143,984. Patented Oct. 28, 1873.

Witnesses
Henry Orth
G. B. Towles

Inventors
Joseph F. Kirkhart
James Ramsay
By W. T. Burris, Atty.

UNITED STATES PATENT OFFICE.

JOSEPH F. KIRKHART AND JAMES RAMSAY, OF LONG CREEK TOWNSHIP, DECATUR COUNTY, IOWA.

IMPROVEMENT IN WATER-WHEELS.

Specification forming part of Letters Patent No. 143,984, dated October 28, 1873; application filed September 16, 1873.

*To all whom it may concern:*

Be it known that we, JOSEPH F. KIRKHART and JAMES RAMSAY, of Long Creek township, in the county of Decatur and State of Iowa, have invented certain new and useful Improvements in Turbine Water-Wheels; and we do hereby declare the following to be a full, clear, and exact description of the invention, such as will enable others skilled in the art to which it pertains to make and use it, reference being had to the accompanying drawings, which form part of this specification, which drawings are in two sheets—Figs. 1 and 2 on the first and Fig. 3 on the second sheet.

Figure 1:
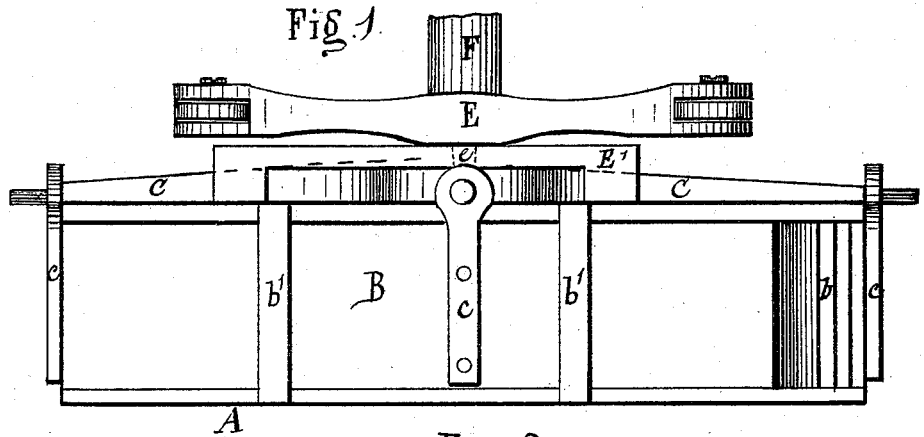
Figure 2:
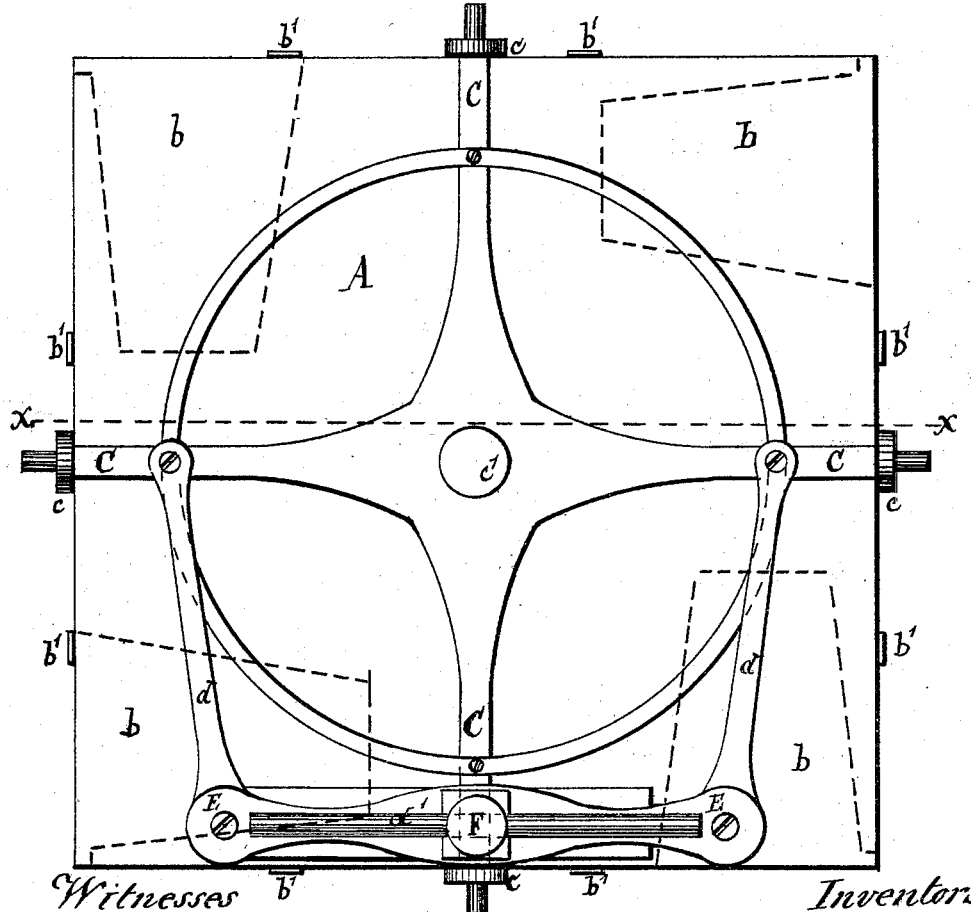
Figure 3:
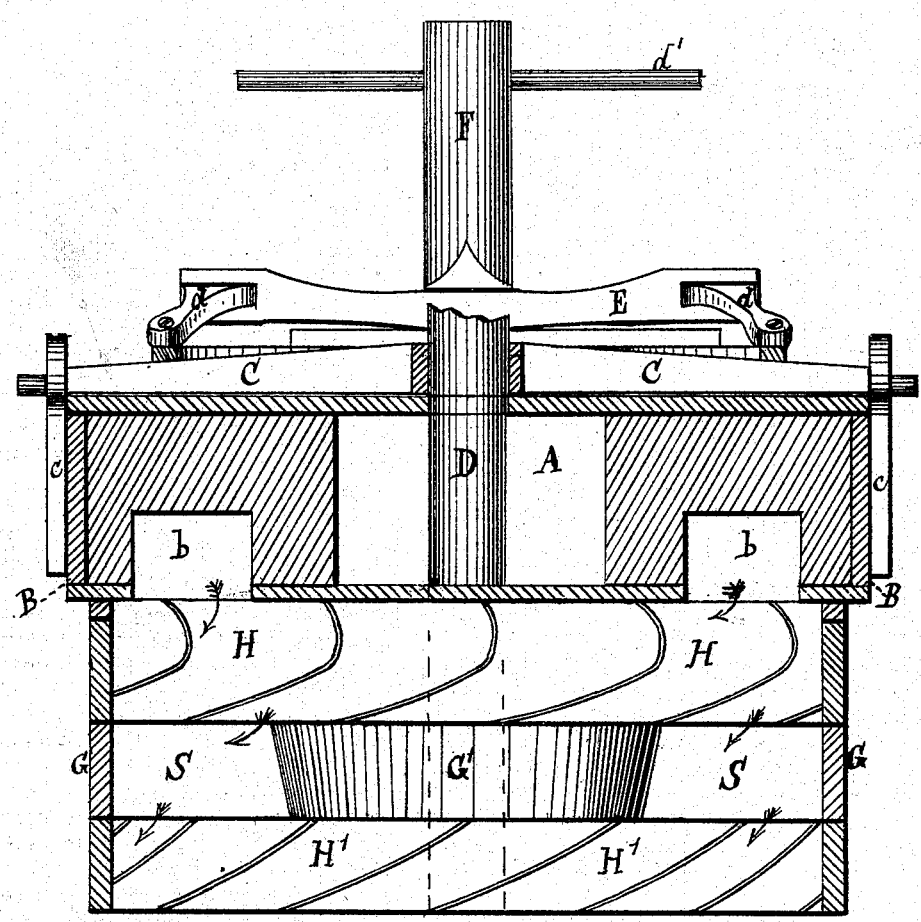

Figure 1 is a side elevation of the cap, showing the chutes and gates. Fig. 2 is a plan view of the same, showing the devices for operating the gates. Fig. 3 is a vertical section of the cap, gates, and chutes, as indicated by line $x\ x$ of Fig. 2, and is also a side view of the wheel with rim removed, showing the sections and double tiers of buckets.

My invention relates to turbine water-wheels; and consists of a wheel having two or more sets or tiers of buckets, so arranged that the water falls from the upper upon the lower buckets, thus increasing the power; and also of the cap or water-box on the top of the wheel, provided with chutes at the four corners of the box, and water-gates for shutting off and regulating the supply of water.

A represents a square cap arranged on the top of the wheel, and provided with chutes $b$ at each corner to admit the water, as shown in Fig. 1, and by dotted lines on Fig. 2. B represents the gates for shutting off and regulating the supply of water, which gates are arranged to slide in rabbets in the sides of the cap under guides $b'\ b'$. C represents four arms, joined at right angles in the center, and provided with a hole, $c^1$, to receive the shaft D, and extend to and pass through eyes on the ends of cleats $c$ on the sides of the gates, and are braced by the circular brace $c^2$. E represents a lever, provided with connecting-bars $d\ d$ and standard F, and lever or handle $d'$ for operating the gates. Lever E rests on a support-bar, E′, and is held in position by pivot $e$, which extends into a hole in bar E′, as represented by dotted lines in Fig. 1. G represents the wheel, made in four sections and provided with upper and lower tiers of buckets H H′, as seen in Fig. 3. The wheel may be made of wood or cast-iron. When made of wood, it is made in four sections, as shown, and each section may be made in triangular sections and all properly bolted together. When made of iron, it is made in two sections, one embracing the upper two and the other the lower two sections, as shown in the drawing; and the center part of the lower section, marked G′, which separates the upper and lower buckets, and forms the open space S between them, is made hollow.

The water, entering at each of the four corners of the cap through chutes $b$, passes into and through buckets H, and then falls through space S upon the lower tier of buckets H′, and its weight and force, in thus falling upon these buckets, increase the power of the wheel. The gates B are all operated at once by means of the levers and arms, as described.

We claim, in a turbine water-wheel—

1. The upper and lower tiers of buckets H H′, separated by a space, S, so that the water, after passing through the upper tier of buckets, falls through the separating space upon the lower tiers of buckets, substantially as described.

2. The cap A, provided with chutes $b$ at each of the corners, and gates B, and their operating devices C, $c$, $d$, $d'$, E, and F, in combination with wheel G, substantially as described.

In testimony that we claim the foregoing we have hereunto set our hands this 25th day of August, 1873.

JOSEPH F. KIRKHART.
JAMES × RAMSAY.
<sub>his</sub>
<sub>mark.</sub>

Witnesses:
 A. BEESON,
 O. J. JOLLEY.